United States Patent
Platek et al.

(10) Patent No.: US 11,995,413 B2
(45) Date of Patent: *May 28, 2024

(54) DATA TRANSFORMATION SYSTEM AND METHOD

(71) Applicant: LISUTO KK, Tokyo (JP)

(72) Inventors: Nir Platek, Tokyo (JP); Pavel Zaslavsky, Haifa (IL)

(73) Assignee: LISUTO KK, Tokyo (JP)

( * ) Notice: Subject to any disclaimer, the term of this patent is extended or adjusted under 35 U.S.C. 154(b) by 558 days.

This patent is subject to a terminal disclaimer.

(21) Appl. No.: 17/070,231

(22) Filed: Oct. 14, 2020

(65) Prior Publication Data

US 2021/0056268 A1 Feb. 25, 2021

Related U.S. Application Data

(63) Continuation of application No. 15/564,297, filed as application No. PCT/IL2016/050374 on Apr. 7, 2016, now Pat. No. 10,846,486.

(Continued)

(51) Int. Cl.
*G06F 40/30* (2020.01)
*G06F 5/00* (2006.01)
(Continued)

(52) U.S. Cl.
CPC .............. *G06F 40/47* (2020.01); *G06F 5/00* (2013.01); *G06F 16/235* (2019.01); *G06F 16/30* (2019.01); *G06F 40/242* (2020.01); *G06Q 10/087* (2013.01); *G06Q 30/0633* (2013.01); *H04M 3/487* (2013.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS 5,751,957 A    5/1998    Hiroya et al.
6,061,675 A * 5/2000    Wical ................... G06F 40/268
                                                            706/45

(Continued)

FOREIGN PATENT DOCUMENTS

CN           1609867      4/2005
CN           1988475      6/2007

(Continued)

OTHER PUBLICATIONS

An International Search Report and a Written Opinion both dated Aug. 12, 2016, which issued during the prosecution of Applicant's PCT/IL2016/050374.

(Continued)

*Primary Examiner* — Lamont M Spooner
(74) *Attorney, Agent, or Firm* — Sughrue Mion, PLLC

(57) ABSTRACT

A method of transforming data including receiving data in a first language specific form, converting the data in the first language specific form to a language agnostic form, storing the data in the language agnostic form, converting the data in the language agnostic form to at least one second language specific form and exporting, on demand, the data in at least one of the at least one second language specific form.

15 Claims, 22 Drawing Sheets

Related U.S. Application Data

(60) Provisional application No. 62/144,407, filed on Apr. 8, 2015.

(51) Int. Cl.

| | | |
|---|---|---|
| *G06F 16/23* | (2019.01) | |
| *G06F 16/30* | (2019.01) | |
| *G06F 40/103* | (2020.01) | |
| *G06F 40/242* | (2020.01) | |
| *G06F 40/47* | (2020.01) | |
| *G06F 40/58* | (2020.01) | |
| *G06Q 10/087* | (2023.01) | |
| *G06Q 30/0601* | (2023.01) | |
| *H04M 3/487* | (2006.01) | |

(56) References Cited

U.S. PATENT DOCUMENTS

| | | | | |
|---|---|---|---|---|
| 6,101,515 A | * | 8/2000 | Wical | G06F 16/353 |
| | | | | 707/E17.058 |
| 6,112,201 A | * | 8/2000 | Wical | G06F 16/34 |
| | | | | 707/999.005 |
| 7,613,996 B2 | * | 11/2009 | Dallett | G06F 40/143 |
| | | | | 715/221 |
| 9,015,730 B1 | * | 4/2015 | Allen | G06F 9/466 |
| | | | | 719/310 |
| 10,846,486 B2 | | 11/2020 | Platek et al. | |
| 2001/0049679 A1 | * | 12/2001 | Yonaitis | G06F 16/3334 |
| | | | | 707/999.005 |
| 2003/0074271 A1 | | 4/2003 | Viswanath et al. | |
| 2003/0167266 A1 | * | 9/2003 | Saldanha | G06F 40/143 |
| 2004/0243554 A1 | * | 12/2004 | Broder | G06F 16/38 |
| 2007/0282872 A1 | * | 12/2007 | Probst | G06F 40/169 |
| 2007/0282892 A1 | * | 12/2007 | Probst | G06F 40/258 |
| | | | | 707/999.102 |
| 2008/0147672 A1 | * | 6/2008 | Pena | G06F 16/951 |
| 2009/0089263 A1 | | 4/2009 | McHugh et al. | |
| 2010/0121630 A1 | * | 5/2010 | Mende | G06F 40/30 |
| | | | | 704/7 |
| 2012/0109786 A1 | * | 5/2012 | Platek | G06Q 30/0603 |
| | | | | 707/E17.044 |
| 2012/0179453 A1 | * | 7/2012 | Ghani | G06F 16/355 |
| | | | | 704/9 |
| 2012/0179633 A1 | * | 7/2012 | Ghani | G06F 16/35 |
| | | | | 706/12 |
| 2012/0303645 A1 | | 11/2012 | Kulkarni-Puranik | |
| 2013/0187926 A1 | * | 7/2013 | Silverstein | G06F 40/143 |
| | | | | 345/440 |
| 2013/0198183 A1 | | 8/2013 | Clendinning et al. | |
| 2013/0346250 A1 | | 12/2013 | Platek | |
| 2014/0019114 A1 | | 1/2014 | Travieso et al. | |
| 2014/0019451 A1 | * | 1/2014 | Buryak | G06F 16/3337 |
| | | | | 707/E17.089 |
| 2014/0052442 A1 | | 2/2014 | Kominek et al. | |
| 2014/0075004 A1 | * | 3/2014 | Van Dusen | G06Q 50/01 |
| | | | | 709/223 |
| 2014/0316768 A1 | * | 10/2014 | Khandekar | G06F 16/3329 |
| | | | | 704/9 |
| 2015/0170234 A1 | * | 6/2015 | Platek | G06F 40/40 |
| | | | | 705/26.61 |
| 2015/0339759 A1 | * | 11/2015 | Pope | G06Q 30/0631 |
| | | | | 705/26.62 |
| 2016/0071181 A1 | * | 3/2016 | Munro | G06Q 30/0625 |
| | | | | 705/26.62 |
| 2016/0078398 A1 | * | 3/2016 | Lu | G06F 16/35 |
| | | | | 705/28 |
| 2018/0137106 A1 | | 5/2018 | Platek et al. | |

FOREIGN PATENT DOCUMENTS

| | | |
|---|---|---|
| CN | 103177036 | 6/2013 |
| CN | 103250171 | 8/2013 |
| JP | H09-81569 | 3/1997 |
| JP | 11-85758 A | 3/1999 |
| JP | 2014-206789 A | 10/2014 |
| WO | 2015/003245 | 1/2015 |
| WO | 2016/162872 | 10/2016 |

OTHER PUBLICATIONS

An International Preliminary Report on Patentability dated Oct. 10, 2017, which issued during the prosecution of Applicant's PCT/IL2016/050374.

U.S. Appl. No. 62/144,407, filed Apr. 8, 2015.

An Office Action dated Aug. 22, 2019, which issued during the prosecution of U.S. Appl. No. 15/564,297.

An Offce Action dated Feb. 4, 2020, which issued during the prosecution of U.S. Appl. No. 15/564,297.

An Office Action dated Jun. 15, 2020, which issued during the prosecution of Applicant's Japanese Patent Application No. 552171/2017.

An Office Action dated May 28, 2020, which issued during the prosecution of Applicant's European App No. 16776227.7.

Notice of Allowance dated Jul. 27, 2020, which issued during the prosecution of U.S. Appl. No. 15/564,297.

An English summary of an Official Action dated May 18, 2021, which issued during the prosecution of Chinese Patent Application No. 201680014842.X.

An English summary of an Official Action dated Nov. 2, 2020, which issued during the prosecution of Chinese Patent Application No. 201680014842.X.

European Search Report dated Sep. 17, 2018 which issued during the prosecution of Applicant's European App No. 167762277.

An Office Action dated Jun. 27, 2023, which issued during the prosecution of Applicant's Japanese Patent Application No. 2022-094315.

\* cited by examiner

FIG. 3A

| SKU | CATEGORY | LISTING DESCRIPTION | CONDITION | PRICE |
|---|---|---|---|---|
| 1253648352 | Cameras/Lenses | 4926298369 New Canon EF 24-105mm F/4 L USM professional lens for Canon DSLR cameras. | new | 1399 |
| 6463837353 | Cameras/Lenses | 18-55mm F/4-5.6 canon EF mount lens. Good, light starter lens. New in box. | new | 129 |

FIG. 3B

| SKU | BRAND | LISTING DESCRIPTION | CATEGORY 1 | CATEGORY2 | PRICE | AVAILABILITY |
|---|---|---|---|---|---|---|
| CN24105 | Canon | Canon EF 24-105mm F/4 L USM for Canon DSLR EF mount Used, perfect condition | Lenses | DSLR | 1345 | In stock |
| CN1855 | Canon | New Canon 18-55mm F/4-5.6 EF mount | Lenses | DSLR | 135 | In stock |

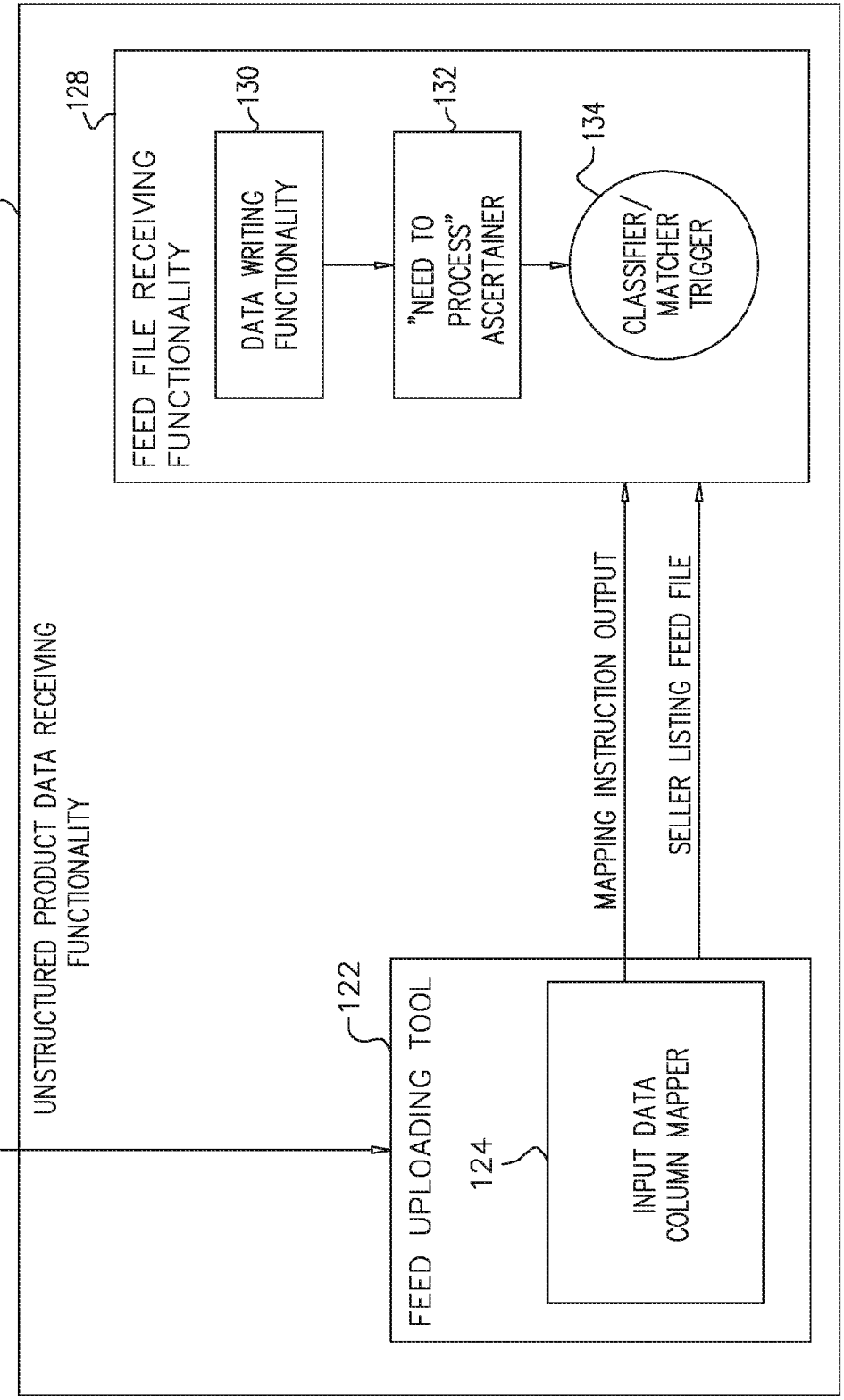

FIG. 7

UNSTRUCTURED LANGUAGE SPECIFIC LISTING TABLE

| UNIQUE LISTING KEY | CATEGORY ID | PRODUCT ID | BRAND | LISTING DESCRIPTION | SELLER CATEGORY | SELLER | PRICE | SELLER SKU | UPDATE DATE | NEED TO PROCESS |
|---|---|---|---|---|---|---|---|---|---|---|
| agsvs142gsgs | | | | 4926298369 New Canon EF 24-105mm F/4 L USM professional lens for Canon DSLR cameras. | Camera/Lenses | 1 | 1399 | 536483 | 1/15/2016 | |
| 6jfy765uyvjd85 | | | | 18-55mm F/4-5.6 canon EF mount lens. Good, light starter lens. New in box | Camera/Lenses | 1 | 129 | 638373 | 1/15/2016 | Yes |
| jfjy654jhg9khb | | | Canon | Canon EF 24-105mm F/4 L USM for Canon DSLR EF mount. Used, perfect condition | Lenses \| DSLR | 2 | 1345 | CN24105 | 1/1/2016 | |
| hgj86jh57ihg78 | | | Canon | New Canon 18-55mm F/4-5.6 EF mount | Lenses \| DSLR | 2 | 135 | CN1855 | 1/1/2016 | |

FIG. 9

CATEGORY STRUCTURE TABLE

| CATEGORY ID | CATEGORY NAME | PARENT CATEGORY ID | PARENT CATEGORY NAME |
|---|---|---|---|
| C1000 | DIGITAL CAMERAS | C100 | PHOTOGRAPHY |
| C1001 | MOBILE PHONES | C101 | ELECTRONICS |
| C1002 | LENSES | C100 | PHOTOGRAPHY |
| C100 | PHOTOGRAPHY | | |
| C101 | ELECTRONICS | | |

FIG. 11

CATEGORY ATTRIBUTE STRUCTURE TABLE

| CATEGORY ID | ATTRIBUTE ID | ATTRIBUTE NAME | ATTRIBUTE TYPE |
|---|---|---|---|
| C1002 | 301 | MIN FOCAL LENGTH | NON DISCRETE VALUE |
| C1002 | 302 | MAX FOCAL LENGTH | NON DISCRETE VALUE |
| C1002 | 303 | MIN APERTURE | DISCRETE VALUE LIST |
| C1002 | 304 | MAX APERTURE | DISCRETE VALUE LIST |
| C1002 | 305 | FOCAL LENGTH UNITS OF MEASURE | DISCRETE VALUE LIST |
| C1002 | 100 | BRAND | DISCRETE VALUE LIST |
| C1002 | 200 | CONDITION | DISCRETE VALUE LIST |

FIG. 12

ATTRIBUTE VALUE STRUCTURE TABLE

| ATTRIBUTE ID | ATTRIBUTE NAME | VALUE ID | VALUE NAME |
|---|---|---|---|
| 303 | MIN APERTURE | 60001 | 4 |
| 303 | MIN APERTURE | 60002 | 5.6 |
| 303 | MIN APERTURE | 60003 | 6.3 |
| 304 | MAX APERTURE | 60001 | 4 |
| 304 | MAX APERTURE | 60002 | 5.6 |
| 304 | MAX APERTURE | 60003 | 6.3 |
| 305 | FOCAL LENGTH UNITS OF MEASURE | 60004 | MM |
| 100 | BRAND | 10000 | CANON |
| 200 | CONDITION | 20000 | NEW |

STRUCTURE TRANSLATION TABLE

| ITEM ID | ITEM TYPE | TRANSLATION | LANGUAGE |
|---|---|---|---|
| C1002 | CATEGORY | LENSES | EN |
| C1002 | CATEGORY | ЛИНЗЫ | RU |
| 100 | ATTRIBUTE | BRAND | EN |
| 100 | ATTRIBUTE | ПРОИЗВОДИТЕЛЬ | RU |
| 101 | ATTRIBUTE | WEIGHT | EN |
| 101 | ATTRIBUTE | ВЕС | RU |
| 102 | ATTRIBUTE | WEIGHT UNITS | EN |
| 102 | ATTRIBUTE | ЕДИНИЦЫ ВЕСА | RU |
| 200 | ATTRIBUTE | CONDITION | EN |
| 200 | ATTRIBUTE | СОСТОЯНИЕ | RU |
| 301 | ATTRIBUTE | MIN FOCAL LENGTH | EN |
| 301 | ATTRIBUTE | МИН ФОКУСНАЯ ДЛИНА | RU |
| 305 | ATTRIBUTE | FOCAL LENGTH UNITS OF MEASURE | EN |
| 305 | ATTRIBUTE | ЕДИНИЦЫ ФОКУСНОЙ ДЛИНЫ | RU |
| 306 | ATTRIBUTE | MOUNT TYPE | EN |
| 306 | ATTRIBUTE | ТИП БАЙОНЕТА | RU |
| 10000 | VALUE | CANON | EN |
| 10000 | VALUE | КАНОН | RU |
| 11000 | VALUE | OZ | EN |
| 11000 | VALUE | УНЦИЯ | RU |
| 11010 | VALUE | GR | EN |
| 11010 | VALUE | ГР | RU |
| 20000 | VALUE | NEW | EN |
| 20000 | VALUE | НОВЫЙ | RU |
| 60002 | VALUE | 5.6 | EN |
| 60002 | VALUE | 5.6 | RU |
| 60005 | VALUE | EF MOUNT | EN |
| 60005 | VALUE | EF | RU |

CATEGORY SPECIFIC FEATURE MATCH MATRIX

| CATEGORY ID | REQUIRED FEATURE MATCH |
|---|---|
| Lenses (C1002) | Min focal length AND Max focal length AND Min Aperture AND Max aperture AND Brand (301 AND 302 AND 303 AND 304 AND BRAND) |

FIG. 17

STRUCTURED PRODUCT TABLE

| PRODUCT ID | CATEGORY ID | PRODUCT NAME | CREATE DATE |
|---|---|---|---|
| 1000 | C1002 | Canon EF 24-105mm F/4 L USM | 1/1/2016 |
| 1001 | C1002 | Canon 18-55mm F/4-5.6 EF | 1/1/2016 |

FIG. 18

STRUCTURED PRODUCT DATA TABLE

| PRODUCT ID | ATTRIBUTE ID | VALUE ID | NUMERIC VALUE | CREATE DATE |
|---|---|---|---|---|
| 1001 | 100 | 1000 | | 1/1/2016 |
| 1001 | 301 | | 18 | 1/1/2016 |
| 1001 | 302 | | 55 | 1/1/2016 |
| 1001 | 303 | 60002 | | 1/1/2016 |
| 1001 | 304 | 60001 | | 1/1/2016 |
| 1001 | 305 | 60004 | | 1/1/2016 |

FIG. 19

MARKETPLACE SPECIFIC DATA SPECIFICATIONS TABLE

| MARKETPLACE | LANGUAGE | LOCALE | CURRENCY | UNITS TYPE | TIMEZONE | DATE TIME FORMAT |
|---|---|---|---|---|---|---|
| ebay.com | EN | US | USD | IMPERIAL | UTC −8 | MM/DD/YYYY AMPM |
| ebay.co.uk | EN | UK | GBP | METRIC | UTC | DD/MM/YYYY 24H |
| amazon.com | EN | US | USD | IMPERIAL | UTC −8 | MM/DD/YYYY AMPM |
| amazon.in | EN | IN | INR | METRIC | UTC+5.5 | DD/MM/YYYY 24H |
| amazon.co.jp | JP | JP | JPY | METRIC | UTC+9 | DD/MM/YYYY 24H |
| rakuten.com | EN | US | USD | IMPERIAL | UTC −8 | MM/DD/YYYY AMPM |
| rakuten.co.jp | JP | JP | JPY | METRIC | UTC+9 | DD/MM/YYYY 24H |
| ozon.ru | RU | RU | RUB | METRIC | UTC+3 | DD/MM/YYYY 24H |

STRUCTURE TRANSLATION TABLE

| ITEM ID | ITEM TYPE | TRANSLATION | LANGUAGE |
|---|---|---|---|
| C1002 | CATEGORY | LENSES | EN |
| C1002 | CATEGORY | ЛИНЗЫ | RU |
| 100 | ATTRIBUTE | BRAND | EN |
| 100 | ATTRIBUTE | БРЭНД | RU |
| 101 | ATTRIBUTE | WEIGHT | EN |
| 101 | ATTRIBUTE | ВЕС | RU |
| 102 | ATTRIBUTE | WEIGHT UNITS | EN |
| 102 | ATTRIBUTE | ЕДИНИЦЫ ВЕСА | RU |
| 200 | ATTRIBUTE | CONDITION | EN |
| 200 | ATTRIBUTE | СОСТОЯНИЕ | RU |
| 301 | ATTRIBUTE | MIN FOCAL LENGTH | EN |
| 301 | ATTRIBUTE | МИН ФОКУСНАЯ ДЛИНА | RU |
| 305 | ATTRIBUTE | FOCAL LENGTH UNITS OF MEASURE | EN |
| 305 | ATTRIBUTE | ЕДИНИЦЫ ФОКУСНОЙ ДЛИНЫ | RU |
| 306 | ATTRIBUTE | MOUNT TYPE | EN |
| 306 | ATTRIBUTE | ТИП БАЙОНЕТА | RU |
| 10000 | VALUE | CANON | EN |
| 10000 | VALUE | УНЦИЯ | RU |
| 11000 | VALUE | OZ | EN |
| 11000 | VALUE | КАНОН | RU |
| 11010 | VALUE | GR | EN |
| 11010 | VALUE | ГР | RU |
| 20000 | VALUE | NEW | EN |
| 20000 | VALUE | НОВЫЙ | RU |
| 60002 | VALUE | 5.6 | EN |
| 60002 | VALUE | 5.6 | RU |
| 60004 | VALUE | MM | EN |
| 60004 | VALUE | MM | RU |
| 60005 | VALUE | EF MOUNT | EN |
| 60005 | VALUE | EF БАЙОНЕТ | RU |

Value in grams = attribute id = 101: value = 17 x 30 = 500

Weight extension = 500 + attribute id=102: value id=11010:RU = 500 ГРАМ

FIG. 23

1. attribute id=100: value=10000:RU +
2. attribute id=301: value =18 +"″"+
3. attribute id=302: value = 55 +
4. attribute id=305: value = 60004:RU +
5. "F/" + attribute id=304: value = 60001:RU +"″"+
6. attribute id=303: value = 60002:RU +
7. attribute id=306: value = 60005:RU Канон 18-55mm F/4-5.6 EF Байонет

| LISTING ID | MARKETPLACE | LANGUAGE SPECIFIC PRODUCT DATA CACHE | | |
|---|---|---|---|---|
| | CATEGORY ID | LANGUAGE SPECIFIC PRODUCT NAME | LANGUAGE SPECIFIC STRUCTURED DATA |
| C1237wedhv26sb | C1002 | Канон 18-55мм F/4-5.6 EF Байонет | МИН ФОКУСНАЯ ДЛИНА:18, МАКС ФОКУСНАЯ ДЛИНА:55, ЕДИНИЦЫ:ММ, МИН ДИАФРАГМА:5.6, МАКС ДИАФРАГМА:4, БРЭНД:КАНОН, ВЕС:500 ГРАМ |

FIG. 24

| CATEGORY ID | CATEGORY NAME | ATTRIBUTE VALUE | MARKETPLACE | MARKETPLACE CATEGORY ID | MARKETPLACE CATEGORY NAME |
|---|---|---|---|---|---|
| C1002 | LENSES | BRAND: CANON | AMAZON | 12345 | LENSES |
| C1002 | LENSES | | EBAY | 6573937 | CANON LENSES |

FIG. 25

| ATTRIBUTE ID | ATTRIBUTE NAME | VALUE ID | VALUE NAME | MARKETPLACE ATTRIBUTE ID | MARKETPLACE ATTRIBUTE NAME | MARKETPLACE VALUE ID | MARKETPLACE VALUE NAME | MARKETPLACE |
|---|---|---|---|---|---|---|---|---|
| 100 | BRAND | 10000 | CANON | 163836 | MAKER | 5373363838 | CANON INC | AMAZON |
| 100 | BRAND | 10000 | CANON | 4546 | MANUFACTURER | F43629 | CANON | EBAY |

FIG. 26

Local price = seller local price * exchange rate to destination marketplace currency Local price = usd 135 * 70 = rub 9450

Condition = attribute id=200:value:RU

Condition = новый

| LISTING ID | PRODUCT ID | CATEGORY ID | LANGUAGE SPECIFIC PRODUCT NAME | LANGUAGE SPECIFIC STRUCTURED DATA | DESTINATION MARKETPLACE | CONDITION | PRICE |
|---|---|---|---|---|---|---|---|
| 237wedhv26sb | 1001 | C1002 | Канон 18–55мм F/4–5.6 EF Байонет | МИН ФОКУСНАЯ ДЛИНА:18, МАКС ФОКУСНАЯ ДЛИНА:55, ЕДИНИЦЫ:ММ, МИН ДИАФРАГМА:5.6, МАКС ДИАФРАГМА:4, БРЭНД:КАНОН, ВЕС:500 ГРАМ CONDITION:NEW | ozon.ru | новый | 9450 |

DATA TRANSFORMATION SYSTEM AND METHOD

REFERENCE TO RELATED APPLICATIONS

The present application is a continuation application of U.S. patent application Ser. No. 15/564,297, filed Oct. 4, 2017, entitled "Data Transformation System and Method", which is a National Phase application of PCT/IL2016/050374, filed Apr. 7, 2016, entitled "Data Transformation System and Method" and which claims priority of U.S. Provisional Patent Application Ser. No. 62/144,407, entitled Data Transmission System and Method, filed Apr. 8, 2015, the disclosures of which are hereby incorporated by reference.

FIELD OF THE INVENTION

The present invention relates to methods and systems for data transformation.

BACKGROUND OF THE INVENTION

Various data transformation systems and methods are known.

SUMMARY OF THE INVENTION

The present invention seeks to provide improved methods and systems for data transformation.

There is thus provided in accordance with a preferred embodiment of the present invention a method of transforming data including receiving data in a first language specific form, converting the data in the first language specific form to a language agnostic form, storing the data in the language agnostic form, converting the data in the language agnostic form to at least one second language specific form and exporting, on demand, the data in at least one of the at least one second language specific form.

Preferably, the converting the data in the language agnostic form to at least one second language specific form takes place on demand.

In accordance with a preferred embodiment of the present invention the data in the at least one second language specific form includes data in a plurality of second language specific forms. Alternatively, the data in the at least one second language specific form includes data in a single second language specific form.

In accordance with a preferred embodiment of the present invention the at least one second language specific form includes the at least first language specific form. Preferably, the data in the at least one second language specific form includes data in the same language as the language of the first language specific form.

Preferably, the method of transforming data also includes converting the data in the first language specific form from unstructured data to structured data and the converting the data in the first language specific form to the language agnostic form includes converting the structured data in the first language specific form to structured data in the language agnostic form.

In accordance with a preferred embodiment of the present invention the data in the first language specific form relates to an object. Additionally, the object includes an article. Preferably, attributes of the article are described by the data. Additionally, the data includes attribute values assigned to corresponding attributes of the article.

There is also provided in accordance with another preferred embodiment of the present invention a system for transforming data including data receiving functionality operable for receiving data in a first language specific form, language specific to language agnostic data converting functionality operable for converting the data in the first language specific form to a language agnostic form, a language-agnostic database configured for storing the data in the language agnostic form, language agnostic to language specific data converting functionality operable for converting the data in the language agnostic form to at least one second language specific form and data export functionality operable for exporting, on demand, the data in at least one of the at least one second language specific form.

In accordance with a preferred embodiment of the present invention the language agnostic to language specific data converting functionality is operable for converting the data in the language agnostic form to at least one second language specific form on demand.

Preferably, the data in the at least one second language specific form includes data in a plurality of second language specific forms. Alternatively, the data in the at least one second language specific form includes data in a single second language specific form.

In accordance with a preferred embodiment of the present invention the at least one second language specific form includes the at least first language specific form. Preferably, the data in the at least one second language specific form includes data in the same language as the language of the first language specific form.

Preferably, the language specific to language agnostic data converting functionality is also operable for converting the data in the first language specific form from unstructured data to structured data and for converting the structured data in the first language specific form to structured data in the language agnostic form.

Preferably, the data in the first language specific form relates to an object. Additionally, the object includes an article. Preferably, attributes of the article are described by the data. Additionally, the data includes attribute values assigned to corresponding attributes of the article.

There is further provided in accordance with a preferred embodiment of the present invention a method for transforming data including receiving unstructured data in a first language specific form, converting the unstructured data in the first language specific form to a structured language agnostic form, storing the data in the structured language agnostic form, converting the data in the structured language agnostic form to at least one second language specific form and exporting, on demand, the data in at least one of the at least one second language specific form.

In accordance with a preferred embodiment of the present invention the converting the data in the structured language agnostic form to at least one second language specific form takes place on demand.

In accordance with a preferred embodiment of the present invention the data in the at least one second language specific form includes data in a plurality of second language specific forms. Alternatively, the data in the at least one second language specific form includes data in a single second language specific form.

Preferably, the at least one second language specific form includes the at least first language specific form. Preferably, the data in the at least one second language specific form includes data in the same language as the language of the first language specific form.

In accordance with a preferred embodiment of the present invention the method of transforming data also includes converting the unstructured data in the first language specific form from unstructured data to structured data and the converting the unstructured data in the first language specific form to the structured language agnostic form includes converting the structured data in the first language specific form to structured data in the language agnostic form.

Preferably, the data in the first language specific form relates to an object. Additionally, the object includes an article. In accordance with a preferred embodiment of the present invention attributes of the article are described by the data. Additionally, the data includes attribute values assigned to corresponding attributes of the article.

There is even further provided in accordance with yet another preferred embodiment of the present invention a system for transforming data including unstructured data receiving functionality operable for receiving unstructured data in a first language specific form, unstructured language specific to structured language agnostic data converting functionality operable for converting the unstructured data in the first language specific form to a structured language agnostic form, a structured language-agnostic database configured for storing the data in the structured language agnostic form, language agnostic to language specific data converting functionality operable for converting the data in the structured language agnostic form to at least one second language specific form and data export functionality operable for exporting, on demand, the data in at least one of the at least one second language specific form.

In accordance with a preferred embodiment of the present invention the language agnostic to language specific data converting functionality is operable for converting the data in the structured language agnostic form to at least one second language specific form on demand.

Preferably, said data in the at least one second language specific form includes data in a plurality of second language specific forms. Alternatively, the data in the at least one second language specific form includes data in a single second language specific form.

In accordance with a preferred embodiment of the present invention the at least one second language specific form includes the at least first language specific form. Preferably, the data in the at least one second language specific form includes data in the same language as the language of the first language specific form.

In accordance with a preferred embodiment of the present invention the unstructured language specific to structured language agnostic data converting functionality is operable for converting the data in the first language specific form from unstructured data to structured data and for converting the structured data in the first language specific form to structured data in the language agnostic form.

Preferably, the data in the first language specific form relates to an object. Additionally, the object includes an article. In accordance with a preferred embodiment of the present invention attributes of the article are described by the data. Additionally, the data includes attribute values assigned to corresponding attributes of the article.

There is yet further provided in accordance with still another preferred embodiment of the present invention a method for transforming product data including providing a structured language-agnostic product database configured for storing, for each of a multiplicity of products, a multiplicity of structured language-agnostic product attribute values assigned to a corresponding multiplicity of structured language-agnostic product attributes, receiving unstructured product data in a first language specific form, analyzing the unstructured product data and extracting, from the unstructured product data in the first language specific form, unstructured product-specific attribute values assigned to corresponding unstructured product attributes, converting the unstructured product-specific attribute values assigned to corresponding unstructured product attributes to a structured language agnostic form, ascertaining whether the structured language-agnostic product-specific attribute values assigned to the corresponding structured language-agnostic product attributes relate to a specific product stored in a structured language-agnostic product database, the structured language-agnostic product database configured for storing, for each of a multiplicity of products, a multiplicity of structured language-agnostic product attribute values assigned to a corresponding multiplicity of structured language-agnostic product attributes, responsive to ascertaining that the structured language-agnostic product-specific attribute values assigned to the corresponding structured language-agnostic product attributes do not relate to a specific product stored in the structured language-agnostic product database, adding a new product having the structured language-agnostic product-specific attribute values assigned to the corresponding structured language-agnostic product attributes to the structured language-agnostic product database and responsive to ascertaining that the structured language-agnostic product-specific attribute values assigned to the corresponding structured language-agnostic product attributes relate to a specific product stored in the structured language-agnostic product database, assigning the structured language-agnostic product-specific attribute values to the corresponding language-agnostic structured product attributes of the specific product.

Preferably, the receiving the unstructured product data in the first language specific form includes receiving the unstructured product data in the first language specific form from a vendor of a product described in the unstructured product data in the first language specific form. Alternatively, the receiving the unstructured product data in the first language specific form includes automatically retrieving the unstructured product data in the first language specific form from any of a plurality of electronic commerce platforms.

Preferably, the multiplicity of products are classified in a multiplicity of product categories. Additionally, the method for transforming product data also includes classifying a product into at least one of the product categories. Preferably, the method for transforming product data also includes analyzing the unstructured product data to classify a product described therein into at least one of the product categories. Additionally, the method for transforming product data also includes employing the classifying for ascertaining whether the structured language-agnostic product-specific attribute values assigned to the corresponding language-agnostic structured product attributes relate to a specific product stored in the structured language-agnostic product database.

In accordance with a preferred embodiment of the present invention the method for transforming product data also includes converting the data in the structured language agnostic form to at least one second language specific form and exporting the product data in at least one of the at least one second language specific form.

Preferably, the method for transforming product data also includes converting the data in the structured language agnostic form to a format suitable for export to any of a plurality of third-party electronic commerce platforms and exporting the product data in the format suitable for export to a particular one of the plurality of third-party electronic commerce platforms to the particular one of the plurality of third-party electronic commerce platforms.

In accordance with a preferred embodiment of the present invention the exporting the product data in at least one of the at least one second language specific form is on demand. Alternatively, the exporting the product data in at least one of the at least one second language specific form is automatic.

Preferably, the converting the unstructured product-specific attribute values assigned to corresponding unstructured product attributes to the structured language agnostic form includes ascertaining whether the unstructured product-specific attribute values and the unstructured product attributes in the first language specific form are included within a dictionary, the dictionary including, for each product attribute and product attribute value included therein, a language agnostic identifier and a translation thereof to at least one of the first language form and to each of the at least one second language specific form, responsive to ascertaining that the unstructured product-specific attribute values and the unstructured product attributes are included within the dictionary, employing the dictionary for converting the unstructured product-specific attribute values and the unstructured product attributes to the structured language agnostic form and responsive to ascertaining that the unstructured product-specific attribute values and the unstructured product attributes are not included within the dictionary, adding each of the unstructured product-specific attribute values and the unstructured product attributes in the first language specific form to the dictionary and assigning a language agnostic identifier to each of the unstructured product-specific attribute values and the unstructured product attributes.

In accordance with a preferred embodiment of the present invention the converting the unstructured product-specific attribute values assigned to corresponding unstructured product attributes to a structured language agnostic form also includes, responsive to ascertaining that the unstructured product-specific attribute values and the unstructured product attributes are not included within the dictionary, automatically translating the unstructured product-specific attribute values and the unstructured product attributes to the dictionary to each of the at least one second language specific form and adding the translation to the dictionary. Preferably, the converting the unstructured product-specific attribute values assigned to corresponding unstructured product attributes to a structured language agnostic form also includes, responsive to ascertaining that the unstructured product-specific attribute values and the unstructured product attributes are not included within the dictionary, prompting an administrator of the system to translate the unstructured product-specific attribute values and the unstructured product attributes to each of the at least one second language specific form and to add the translation to the dictionary.

In accordance with a preferred embodiment of the present invention the converting the product data in the structured language agnostic form to the at least one of the at least second language specific form employs the dictionary.

In accordance with a preferred embodiment of the present invention the converting the product data in the structured language agnostic form to the at least one of the at least second language specific form takes place on demand. Alternatively, the converting the product data in the structured language agnostic form to the at least one of the at least one second language specific form takes place automatically.

Preferably, said data in the at least one second language specific form includes data in a plurality of second language specific forms. Alternatively, the data in the at least one second language specific form includes data in a single second language specific form.

In accordance with a preferred embodiment of the present invention the at least one second language specific form includes the at least first language specific form. Preferably, the data in the at least one second language specific form includes data in the same language as the language of the first language specific form.

There is also provided in accordance with still another preferred embodiment of the present invention a multi-language product catalog system including unstructured product data receiving functionality operable for receiving unstructured product data in a first language specific form, unstructured product data extracting functionality operable for analyzing the unstructured product data and for extracting, from the unstructured product data in the first language specific form, unstructured product-specific attribute values assigned to corresponding unstructured product attributes, unstructured language specific to structured language agnostic product data converting functionality operable for converting the unstructured product-specific attribute values assigned to corresponding unstructured product attributes to a structured language agnostic form and product matching functionality operable for ascertaining whether the structured language-agnostic product-specific attribute values assigned to the corresponding structured language-agnostic product attributes relate to a specific product stored in the structured language-agnostic product database, responsive to ascertaining that the structured language-agnostic product-specific attribute values assigned to the corresponding structured language-agnostic product attributes do not relate to a specific product stored in the structured language-agnostic product database, adding a new product having the structured language-agnostic product-specific attribute values assigned to the corresponding structured language-agnostic product attributes to the structured language-agnostic product database and responsive to ascertaining that the structured language-agnostic product-specific attribute values assigned to the corresponding structured language-agnostic product attributes relate to a specific product stored in the structured language-agnostic product database, assigning the structured language-agnostic product-specific attribute values to the corresponding language-agnostic structured product attributes of the specific product.

Preferably, the unstructured product data receiving functionality is operable for receiving the unstructured product data in the first language specific form from a vendor of a product described in the unstructured product data in the first language specific form. In accordance with a preferred embodiment of the present invention the unstructured product data receiving functionality is operable for receiving the unstructured product data in the first language specific form by automatically retrieving the unstructured product data in the first language specific form from any of a plurality of electronic commerce platforms.

Preferably, the multiplicity of products are classified in a multiplicity of product categories. In accordance with a preferred embodiment of the present invention the multi-language product catalog system also includes product classification functionality operable for classifying a product into at least one of the product categories. Additionally, the product classification functionality is operable for analyzing the unstructured product data to classify a product described therein into at least one of the product categories. Preferably, the product matching functionality is also operable for employing the product classification functionality for ascertaining whether the structured language-agnostic product-specific attribute values assigned to the corresponding language-agnostic structured product attributes relate to a specific product stored in the structured language-agnostic product database.

In accordance with a preferred embodiment of the present invention the multi-language product catalog system also includes language agnostic to language specific product data converting functionality operable for converting the product data in the structured language agnostic form to at least one second language specific form and product data export functionality operable for exporting the product data in at least one of the at least one second language specific form. Additionally, the language agnostic to language specific product data converting functionality is also operable for converting the product data in the structured language agnostic form to a format suitable for export to any of a plurality of third-party electronic commerce platforms and the product data export functionality is also operable for exporting the product data in the format suitable for export to a particular one of the plurality of third-party electronic commerce platforms to the particular one of the plurality of third-party electronic commerce platforms.

Preferably, the product data export functionality is operable for exporting the product data in at least one of the at least one second language specific form on demand. Alternatively, the product data export functionality is operable for automatically exporting the product data in at least one of the at least one second language specific form.

In accordance with a preferred embodiment of the present invention the multi-language product catalog system also includes a dictionary including, for each product attribute and product attribute value included therein, a language agnostic identifier and a translation thereof to at least one of the first language form and to each of the at least one second language specific form.

In accordance with a preferred embodiment of the present invention the unstructured language specific to structured language agnostic product data converting functionality is also operable for ascertaining whether the unstructured product-specific attribute values and the unstructured product attributes in the first language specific form are included within the dictionary, responsive to ascertaining that the unstructured product-specific attribute values and the unstructured product attributes are included within the dictionary, for employing the dictionary for converting the unstructured product-specific attribute values and the unstructured product attributes to the structured language agnostic form and responsive to ascertaining that the unstructured product-specific attribute values and the unstructured product attributes are not included within the dictionary, for adding each of the unstructured product-specific attribute values and the unstructured product attributes in the first language specific form to the dictionary and for assigning a language agnostic identifier to each of the unstructured product-specific attribute values and the unstructured product attributes.

In accordance with a preferred embodiment of the present invention the unstructured language specific to structured language agnostic product data converting functionality is also operable, responsive to ascertaining that the unstructured product-specific attribute values and the unstructured product attributes are not included within the dictionary, for automatically translating the unstructured product-specific attribute values and the unstructured product attributes to the dictionary to each of the at least one second language specific form and for adding the translation to the dictionary. Additionally, the unstructured language specific to structured language agnostic product data converting functionality is also operable, responsive to ascertaining that the unstructured product-specific attribute values and the unstructured product attributes are not included within the dictionary, for prompting an administrator of the system to translate the unstructured product-specific attribute values and the unstructured product attributes to each of the at least one second language specific form and to add the translation to the dictionary.

Preferably, the language agnostic to language specific product data converting functionality is operable for employing the dictionary for converting the product data in the structured language agnostic form to the at least one of the at least second language specific form.

In accordance with a preferred embodiment of the present invention the language agnostic to language specific product data converting functionality is operable for converting the product data in the structured language agnostic form to the at least one of the at least second language specific form on demand. Alternatively, the language agnostic to language specific product data converting functionality is operable for automatically converting the product data in the structured language agnostic form to the at least one of the at least second language specific form.

Preferably, the data in the at least one second language specific form includes data in a plurality of second language specific forms. Alternatively, the data in the at least one second language specific form includes data in a single second language specific form.

In accordance with a preferred embodiment of the present invention the at least one second language specific form includes the at least first language specific form. Preferably, the data in the at least one second language specific form includes data in the same language as the language of the first language specific form.

BRIEF DESCRIPTION OF THE DRAWINGS

The present invention will be understood and appreciated more fully from the following detailed description, taken in conjunction with the drawings in which:

FIGS. 3A and 3B show two examples of unstructured, language-specific listing data, each of which forms part of a different seller feed file;

FIG. 4 is a simplified block diagram illustration of Unstructured Product Data Receiving Functionality (UPDRF), which forms part of an embodiment of the system of FIG. 1;

FIG. 7 is a simplified example of unstructured, language-specific listing data as initially stored in a database, which forms part of an embodiment of the system of FIG. 1;

FIG. 9 is a simplified illustration of a category structure table employed in the product data extracting functionality and product matching functionality, which forms part of an embodiment of the system of FIG. 1;

FIG. 11 is a simplified illustration of a typical category attribute structure table employed by the extraction functionality of FIG. 10;

FIG. 12 is a simplified illustration of a typical attribute value structure table employed by the extraction functionality of FIG. 10;

FIG. 13 is a simplified illustration of part of a typical structure translation table employed by an embodiment of the system of FIG. 1;

FIG. 15 is a simplified illustration of a typical category specific matrix matching rule;

FIG. 17 is a simplified illustration of part of a structured product table;

FIG. 18 is a simplified illustration of part of a structured product data table;

FIG. 19 is a simplified illustration of part of a typical marketplace specific data specifications table;

FIG. 21 is a simplified illustration of part of a structure translation table;

FIG. 22 is a simplified flow chart of a typical product data weight attribute extension and conversion rule;

FIG. 23 is a simplified illustration of a typical language specific, marketplace specific, product listing creation rule;

FIG. 24 is a simplified illustration of mapping of categories to a specific marketplace;

FIG. 25 is a simplified illustration of mapping of attribute-value pairs to a specific marketplace; and FIG. 26 is a simplified illustration of a typical language specific, marketplace specific, listing data conversion rule.

DETAILED DESCRIPTION OF A PREFERRED EMBODIMENT

Figure 1:
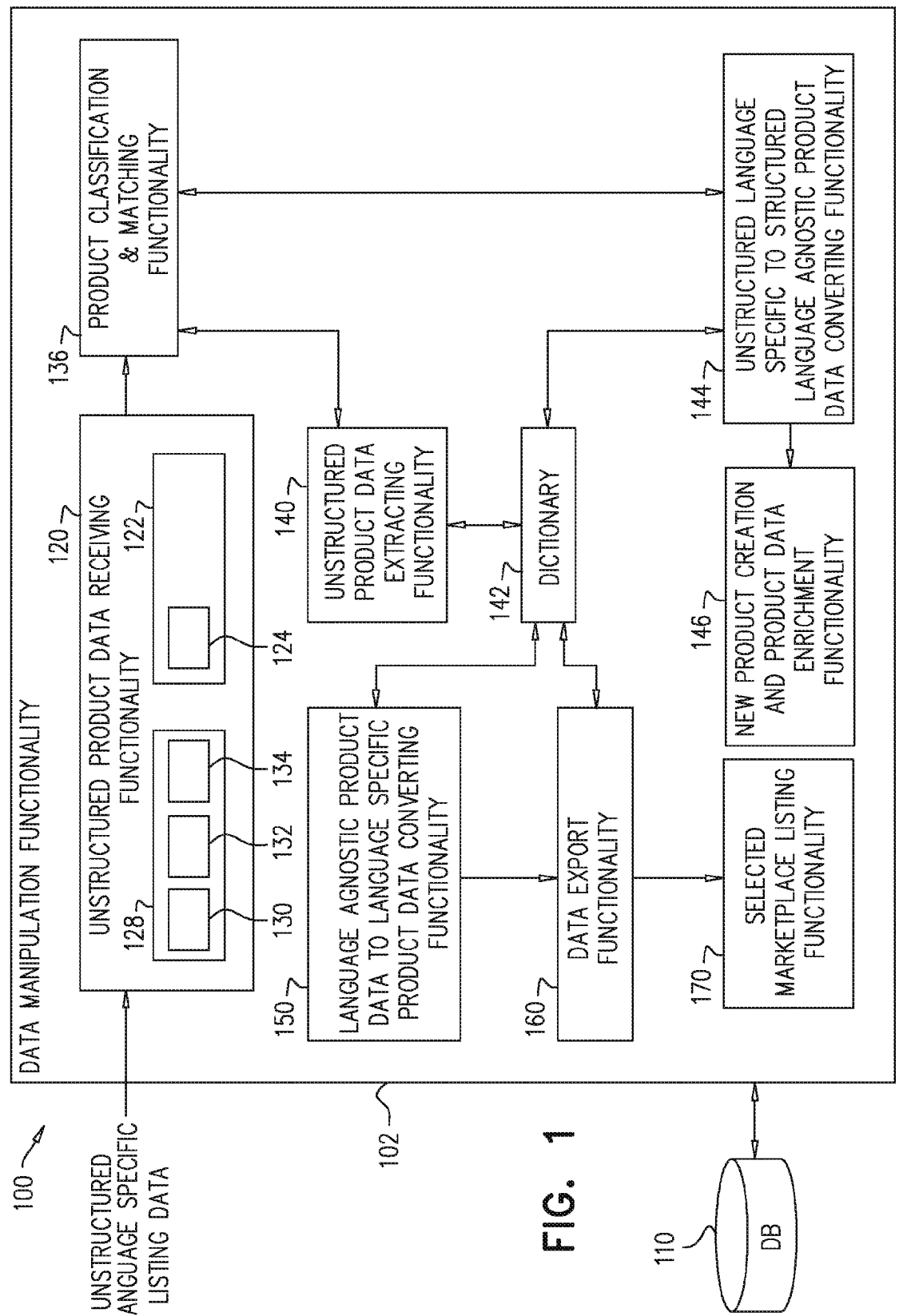
FIG. 1 is a simplified block diagram illustration of a data transformation system, constructed and operative in accordance with a preferred embodiment of the present invention.

Reference is now made to FIG. 1, which is a simplified block diagram illustration of a data transformation system 100, constructed and operative in accordance with a preferred embodiment of the present invention. FIG. 1 illustrates an embodiment of the present invention in the context of a multi-language electronic commerce environment, it being understood that this and other embodiments of the present invention are not necessary limited to such an environment.

Conventional electronic commerce platforms typically facilitate listing of products in a semi-structured form. The formats required for listing feeds to the various conventional electronic commerce platforms differ from one to the other and are language specific. Therefore, merchants wishing to list product offerings on a wide range of electronic commerce platforms typically need to list their products separately on each electronic commerce platform and in every desired language.

It is a particular feature of an embodiment of the present invention that it facilitates importing unstructured product listings in any of a first plurality of languages, converting the imported product listings to a structured language-agnostic form, and subsequently providing the product listings in any of a second plurality of languages. The system of an embodiment of the present invention renders a product listing suitable for listing in a structured multi-language catalog or on any suitable electronic commerce platform, in any language.

It is appreciated that the second plurality of languages typically also includes the language of the original product listing and that the system of an embodiment of the present invention may be utilized to import an unstructured product listing in a first language and to provide a structured product listing in the same language.

As seen in FIG. 1, data transformation system 100 typically includes data manipulation functionality 102, interacting with a database 110 which forms part of data transformation system 100. Database 110 preferably includes storage for unstructured product listings, which are typically provided as inputs in a language specific format, as well as structured product listings, which are provided by the data manipulation functionality 102 of data transformation system 100. Structured product listings may be stored in database 110 in both a language agnostic format as well as one or more language specific formats.

The data manipulation functionality 102 of data transformation system 100 preferably includes at least the following, preferably interfacing with database 110:

unstructured product data receiving functionality 120, which is described further hereinbelow with reference to FIG. 4 and typically includes a feed uploading tool 122, including an input data mapper 124, and feed file receiving functionality 128, which preferably includes data writing functionality 130, a NEED TO PROCESS ascertainer 132 and a classifier/matcher trigger 134;

product classification/matching functionality 136;

unstructured product data extracting functionality 140 interacting with, inter alia, a dictionary 142;

unstructured language specific to structured language agnostic product data converting functionality 144 interacting with, inter alia, dictionary 142;

new product creation and product data enrichment functionality 146;

language agnostic product data to language specific product data converting functionality 150;

data export functionality 160; and selected marketplace listing functionality 170.

These functionalities are explained further hereinbelow with reference to FIGS. 4-25.

Figure 2:
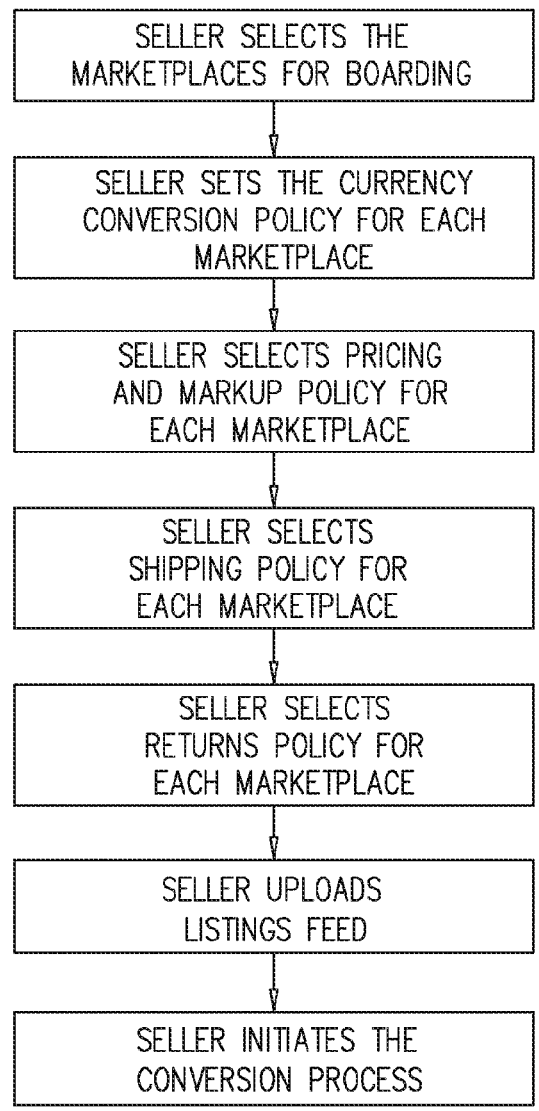
FIG. 2 is a simplified flowchart illustrating some initial steps performed by a seller in cooperation with an embodiment of the system of FIG. 1.

Reference is now made to FIG. 2, which illustrates typical initial operations performed by a seller, employing the system of FIG. 1. As seen in FIG. 2, the seller selects the marketplaces in which he wishes to list his products, here also termed "marketplaces for boarding." The seller preferably selects a currency conversion policy for each marketplace, a pricing and markup policy for each marketplace and shipping and return policies for each marketplace. The seller then uploads the seller listing feed file to database 110 in the system of FIG. 1. As seen in FIG. 2, following uploading of the seller listing file, the seller initiates the conversion process of the system of the present invention to convert the unstructured language specific product listings to structured language agnostic product listings, which are then stored in database 110.

As seen in the illustrated embodiment of FIG. 1, unstructured, language-specific listing data forming part of a seller listing feed file is typically provided to data transformation system 100 via Unstructured Product Data Receiving Functionality (UPDRF) 120. Preferably, data transformation system 100 stores the unstructured, language-specific listing data in database 110. Examples of two different seller listing feed files appear in FIGS. 3A and 3B.

It is appreciated that each of the examples of seller listing feed files in FIGS. 3A and 3B includes two separate listings for a camera lens. The language of all listings in FIGS. 3A and 3B is English and the listing data in both examples includes free text describing not only the camera lens but also the condition of the lens and price of the lens. In one case shipping data is also included.

Unstructured Product Data Receiving Functionality (UPDRF) 120 is illustrated generally in FIG. 4 and includes feed uploading tool 122, which receives the unstructured, language-specific listing data, typically in the form of a seller feed file, such as that shown in FIGS. 3A and 3B. Feed uploading tool 122 typically is implemented on a web page associated with a portal of the system of FIG. 1, which also enables the functionality described hereinabove with reference to FIG. 2.

Figure 5:
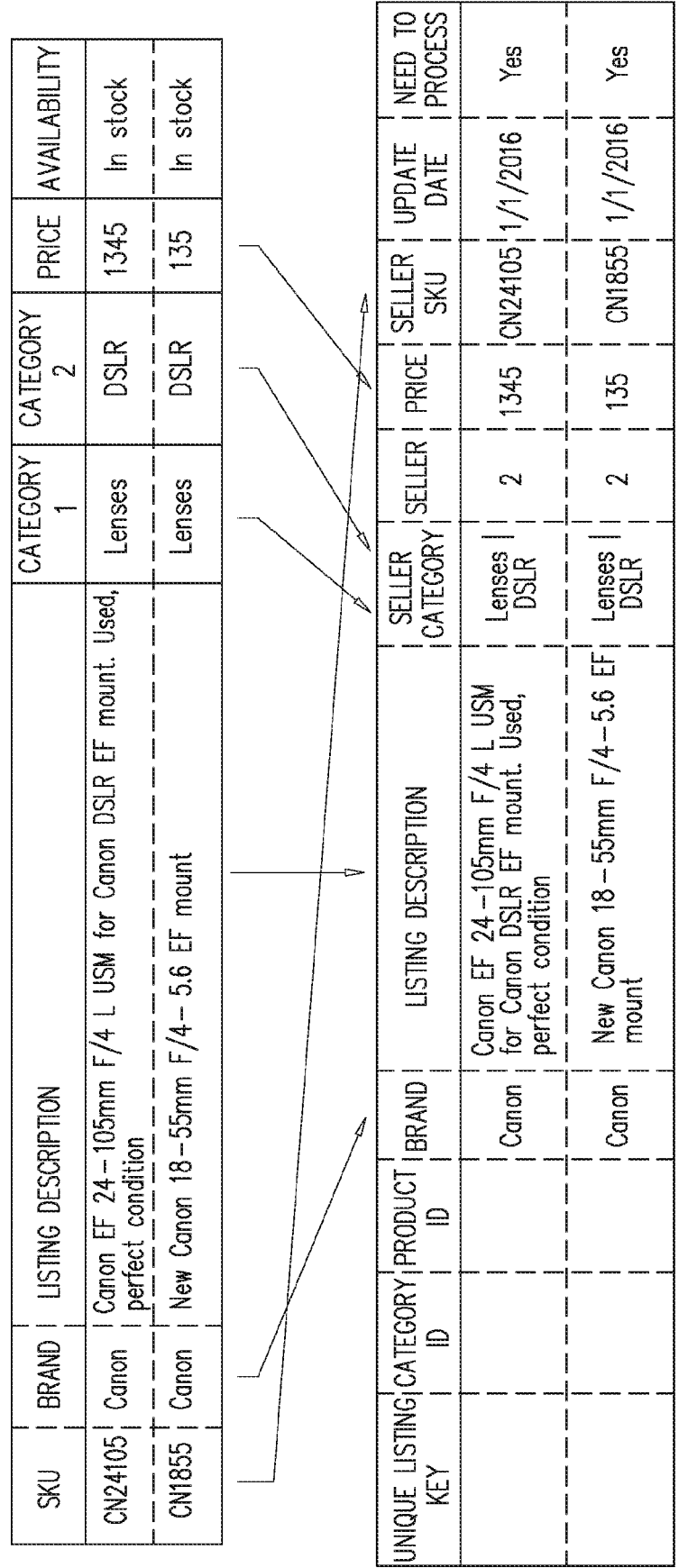
FIG. 5 is a simplified illustration which illustrates operation of an input data column mapper, which forms part of the Unstructured Product Data Receiving Functionality (UPDRF) of FIG. 4.

Feed uploading tool 122 includes, inter alia, input data column mapper 124, which, on the basis of instructions received from the seller, maps the columns in the seller listing feed file to columns in database 110. The input data column mapper 124 provides a mapping instruction output, which is employed by unstructured product data receiving functionality 120 of data transformation system 100 to rearrange the columns in the seller listing feed file to correspond to the columns in database 110 and then uploads the rearranged data to database 110. FIG. 5 illustrates the operation of the input data column mapper 124.

Figure 6:
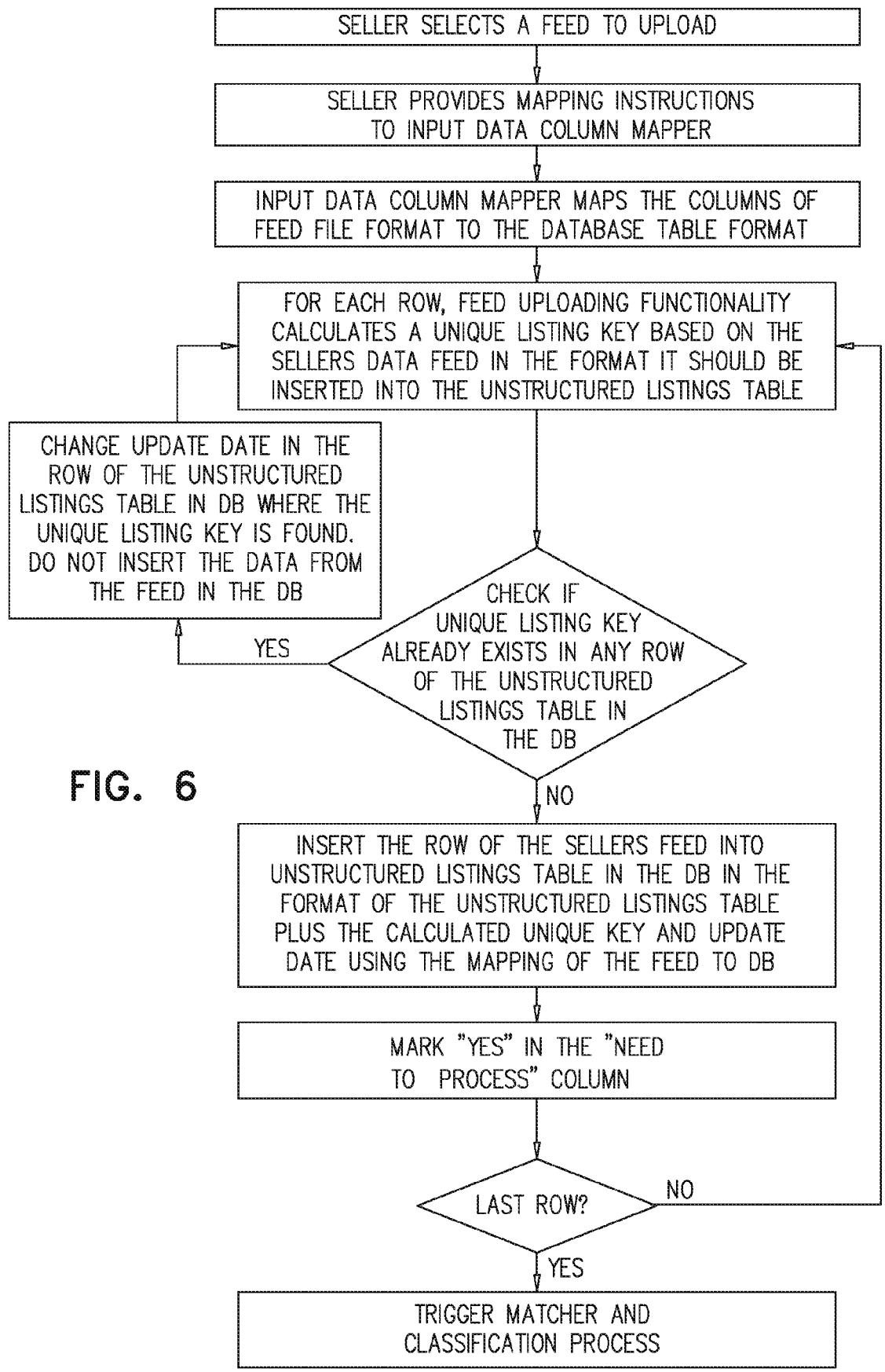
FIG. 6 is a simplified flowchart illustrating operation of the Unstructured Product Data Receiving Functionality (UPDRF) of FIG. 4.

A simplified flow chart summarizing a preferred process for uploading a seller listing feed file to the database 110 appears in FIG. 6. In addition to the mapping instruction output provided by input data column mapper 124, the seller listing feed file and the mapping instruction output are processed by Feed File Receiving Functionality 128, also forming part of Unstructured Product Data Receiving Functionality (UPDRF) 120.

Feed File Receiving Functionality 128 includes data writing functionality 130, which writes data from each row in the seller listing feed into a corresponding row in the database 110 in accordance with the mapping instructions generated by input data column mapper 124. The data writing functionality 130 also adds to each row a unique listing key, which is preferably generated by operation of a hash function, such as a conventional MD5 hash function, on the listing data.

The data writing functionality 130 also preferably adds to each row an update date, indicating the date at which the seller listing data is uploaded to database 110.

Feed File Receiving Functionality 128 also includes a NEED TO PROCESS ascertainer 132, which ascertains whether a newly loaded listing relates to a listing already present on the database, and if not, lists the newly loaded listing as being subject to a need to process. The NEED TO PROCESS ascertainer 132 compares the unique listing key of the newly added row with the unique listing key of all listings in the database. If no match is found, a NEED TO PROCESS flag appears in a NEED TO PROCESS column of the newly added row.

Feed File Receiving Functionality 128 additionally includes classifier/matcher trigger 134. Classifier/matcher trigger 134 operates only when the entire seller listing feed file has been uploaded to database 110 and a unique listing key has been generated for each new row.

Following uploading of the entire seller listing feed file, the classifier/matcher trigger 134 initiates classification/matching functionality 136, which processes rows in which a NEED TO PROCESS flag appears in the NEED TO PROCESS column of a newly added row. Classification/matching functionality 136 attempts to match a new listing with a product which is already in database 110.

An exemplary updated unstructured language specific listing table stored in database 110, which includes the listing data appearing in the seller listing feed files of FIGS. 3A and 3B, is seen in FIG. 7. It is seen that each row includes, inter alia, a unique listing key, an update date and, where appropriate, a NEED TO PROCESS flag.

As described hereinabove, following uploading of the entire seller listing feed file, the classifier/matcher trigger 134 initiates classification/matching functionality 136 which processes rows in which a NEED TO PROCESS flag appears.

Classification/matching functionality 136 is described hereinbelow with respect to FIG. 8, which presents a generalized overview.

Figure 8:
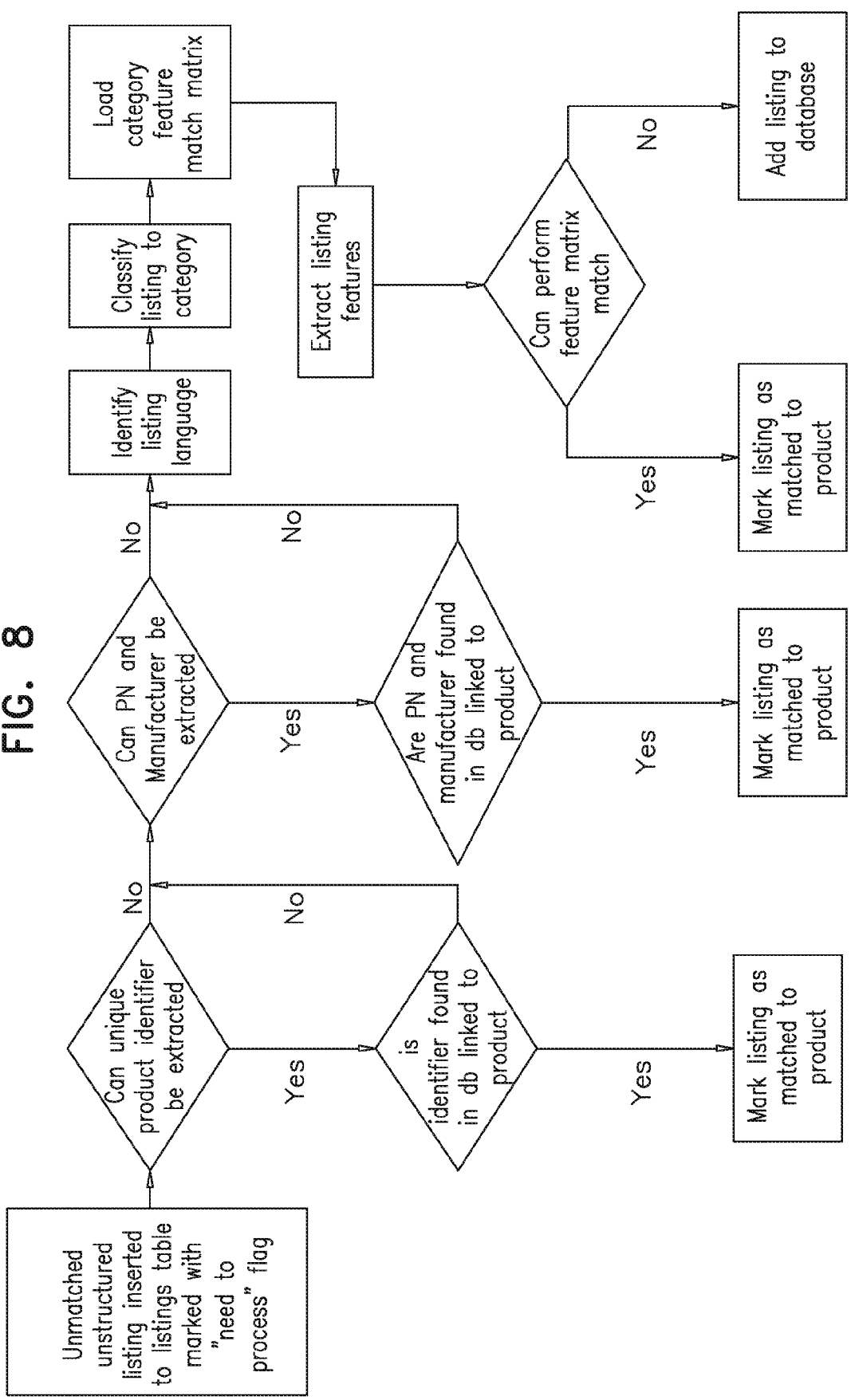
FIG. 8 is a simplified flowchart illustrating operation of product data extracting functionality and product matching functionality, which form part of an embodiment of the system of FIG. 1.

As seen in FIG. 8, classification/matching functionality 136 first checks for the existence of a unique product identifier, such as a UPC code or its equivalent, which consists entirely of numbers, in the new listing. If such a unique product identifier is extracted from the data in the listing description column of a row as stored in database 110 (FIG. 7) from the seller listing feed file and that unique product identifier is already stored in database 110, the product represented by the listing is matched to the product already stored in database 110.

Should matching using a unique product identifier not be achieved, classification/matching functionality 136 then tries to extract a manufacturer and Manufacturer's Product Number, which may consist of numbers and letters, normally in Latin characters, from the new listing. If a manufacturer and a Manufacturer's Product Number is extracted from the data in the listing description column of a row as stored in database 110 (FIG. 5) from the seller listing feed file and that manufacturer and Manufacturer's Product Number is already stored in database 110, the product represented by the listing is matched to the product already stored in database 110.

Should matching using a unique product identifier or a manufacturer and Manufacturer's Product Number not be achieved, classification/matching functionality 136 then tries to identify the language of the new listing. This is achieved using conventional techniques, such as can be found at https://pypi.python.org/pypi/langdetect.

Once the language of the new listing is identified, the listing is classified into a category. Classification/matching functionality 136 classifies the listing into a category by employing language specific functionality, and preferably employing a trained statistical model to classify all of the listing data in each newly added row and to classify the row as relating to one of a plurality of categories in a category structure table, stored in database 110, a simplified example of which appears in FIG. 9.

Considering FIG. 9, it is seen that the category structure includes an indication of the existence of a parent-child relationship between some of the categories. Thus, for example, categories C1000 and C1002 are related to parent category C100, category C1001 is related to parent category C101 and categories C100 and C101 do not have a parent category. It is appreciated that the classification functionality is operative to classify each newly added row into the most specific category, e.g. a child category, if one exists. The classification functionality is operative to assign a category ID to each row. This category ID is language agnostic.

Once the category of the listing is ascertained, unstructured product data extracting functionality 140 extracts various attributes and values from the listing data and stores the attributes and values in a listing extracted data language specific cache. An example of such a step is illustrated diagrammatically in FIG. 10.

Figure 10:
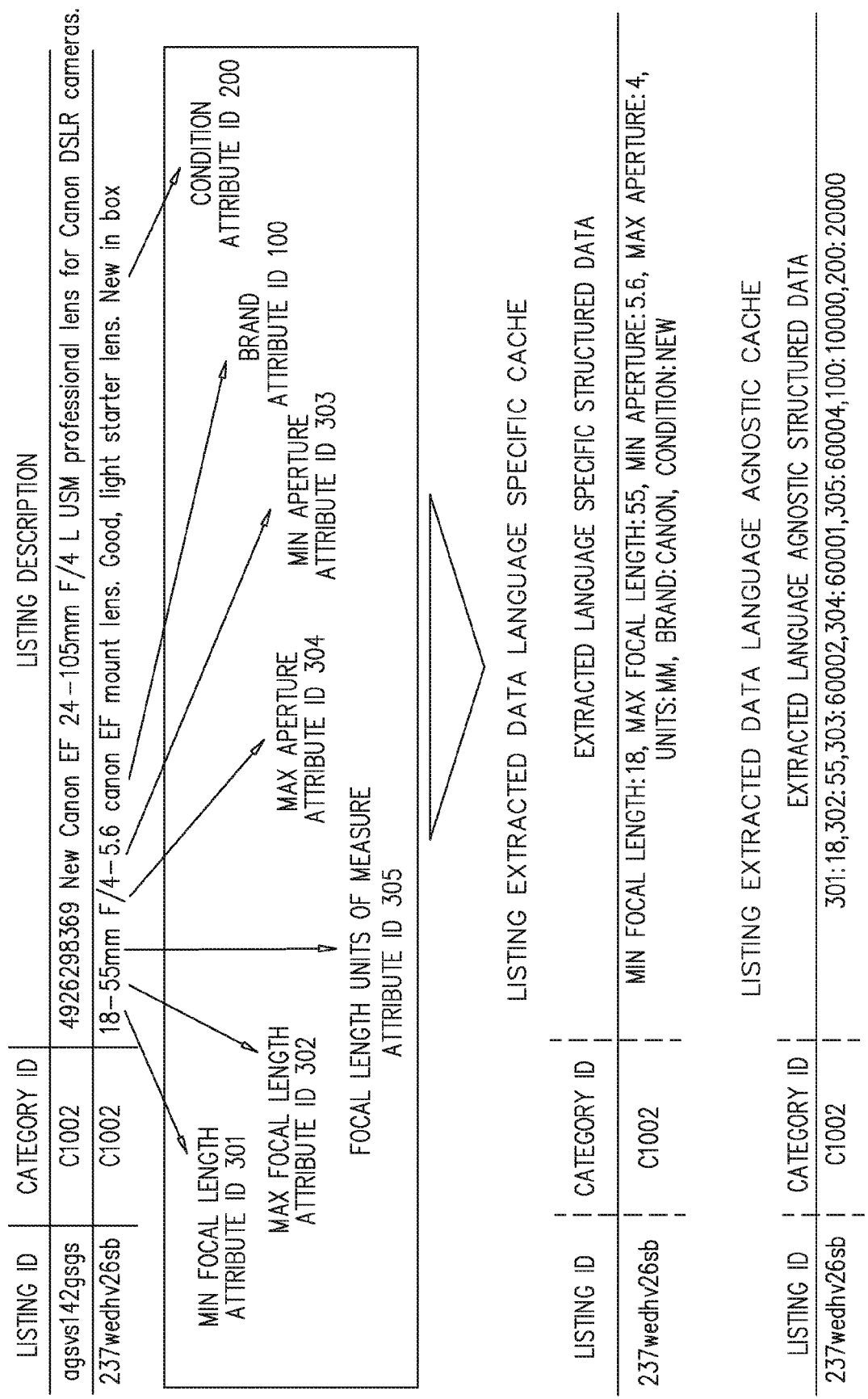
FIG. 10 is a simplified illustration of an example of operation of product data extracting functionality, which forms part of an embodiment of the system of FIG. 1.
Figure 14A:
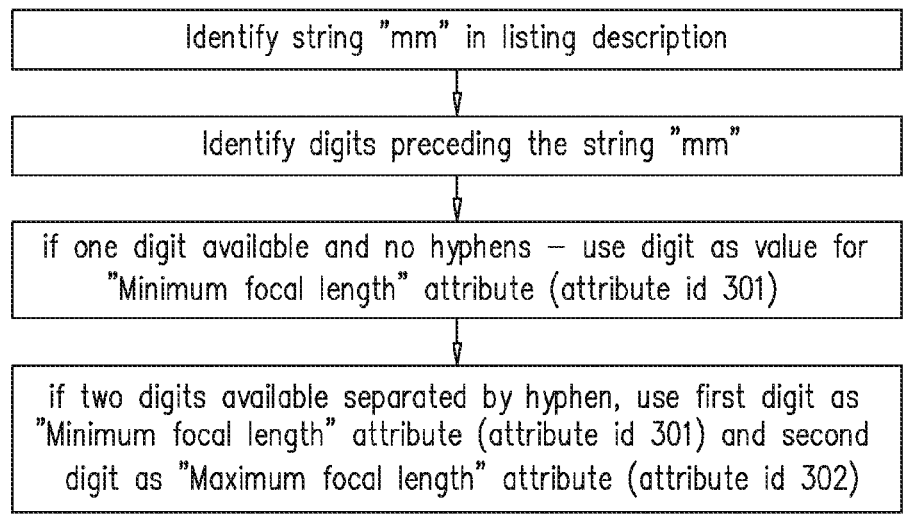
FIGS. 14A and 14B are simplified flow charts of two category specific rule sets employed by the extraction functionality of FIG. 10.
Figure 14B:
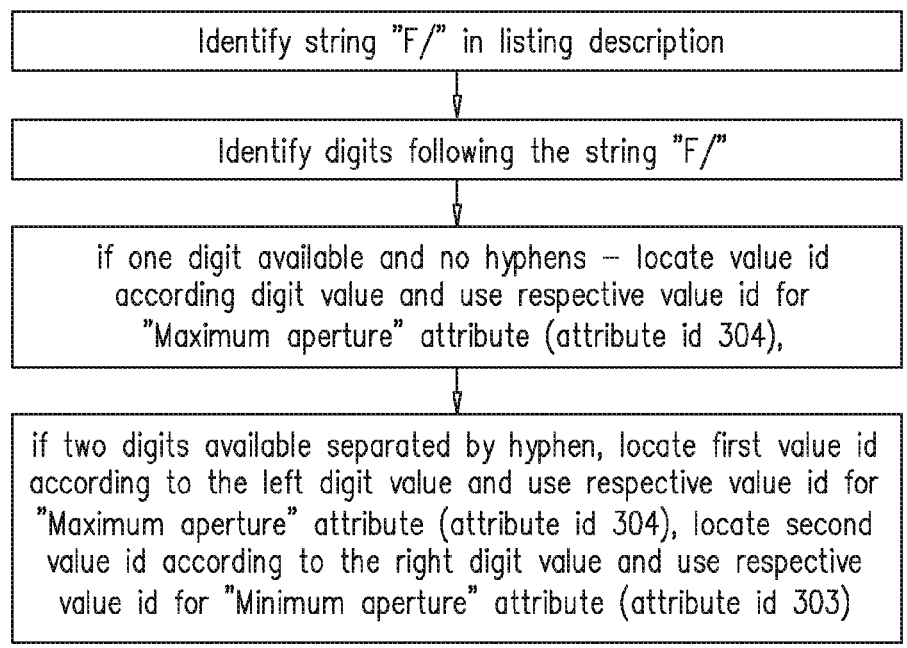

From a consideration of FIG. 10, it is seen that various structured language specific attributes and values are extracted from the unstructured language specific listing data by unstructured product data extracting functionality 140. It is also appreciated that each of the extracted attributes and values has a corresponding ID, which is language agnostic. The extracted language specific structured data is preferably stored temporarily in the listing extracted data language specific cache and unstructured language specific to structured language agnostic product data converting functionality 144 provides the corresponding extracted language agnostic structure data, which is preferably temporarily stored in a listing extracted data language agnostic cache.

Each attribute has an attribute ID. FIG. 11 is an example of a category attribute structure table, stored in database 110, of attributes which are associated with a given category, here Lenses, whose Category ID is C1002 (FIG. 9). It is seen that each attribute has an attribute ID which is language agnostic and is characterized by an attribute type. The attribute types typically include:
- a discrete value list—a predetermined discrete number of predetermined values;
- a number—a number, which may have a great number of values Each value has a value ID. FIG. 12 is a simplified example of an attribute value structure table, stored in database 110, of values which are associated with various attributes (FIG. 11).

It is appreciated that various attributes and values can be applicable to multiple categories although this is rare and is generally assumed not to occur.

It is appreciated that structures exemplified in the tables of FIGS. 9, 11 and 12 are related to a very large language specific/language agnostic table stored in database 110, which stores product data corresponding to listing descriptions in all relevant languages for categories, attributes and values and their corresponding language agnostic IDs. Dictionary 142 is embodied, inter alia, in a language specific/language agnostic table, a simplified example of which appears in FIG. 13. In practice, structures exemplified in the tables of FIGS. 9, 11 and 12 may be stored in database 110 without a language specific category, attribute or value name.

Preferably the entire language specific/language agnostic table, which typically includes hundreds of thousands, if not millions, of entries is not used in matching. Instead, only those entries in the ascertained language are used, and of those entries, initially only those entries relating to categories (FIG. 9) are employed in the functionality of FIG. 10.

Only once the category of a listing has been ascertained, is matching of attributes and values attempted by using only those entries (FIGS. 11 and 12) in the language specific/language agnostic table (FIG. 13) which relate to the already ascertained language and category.

Preferably in matching attributes and values, an attempt is first made to match values, using a value table, exemplified in FIG. 13, since in practice most important values are single attribute specific, so that by matching values, an attribute match is also achieved.

Turning once again to FIG. 10, it is appreciated that there exist various rules which identify various listing data elements, typically values, and associate them with various attributes. For examples "18-55" is recognized by rule as referring to a focal length and "F/" refers to a lens aperture. Two typical sets of rules useful in the functionality of FIG. 11 appear in FIGS. 14A and 14B.

Returning now to FIG. 8, it is seen that a category specific feature match matrix is employed for matching. This matrix defines, for each category, the minimum set of attributes which must be known in order to establish a product match for a product in that category. An example of such a matrix appears in FIG. 15.

If the attributes and values required to establish a product match are extracted, and a product in the database includes all of the attributes and values specified in the matrix, the product in the new listing is matched to a product in the database.

If the attributes and values required to establish a product match are not extracted, system 100 adds the listing to database 110 utilizing the new product creation and data enrichment functionality 146.

Figure 16:
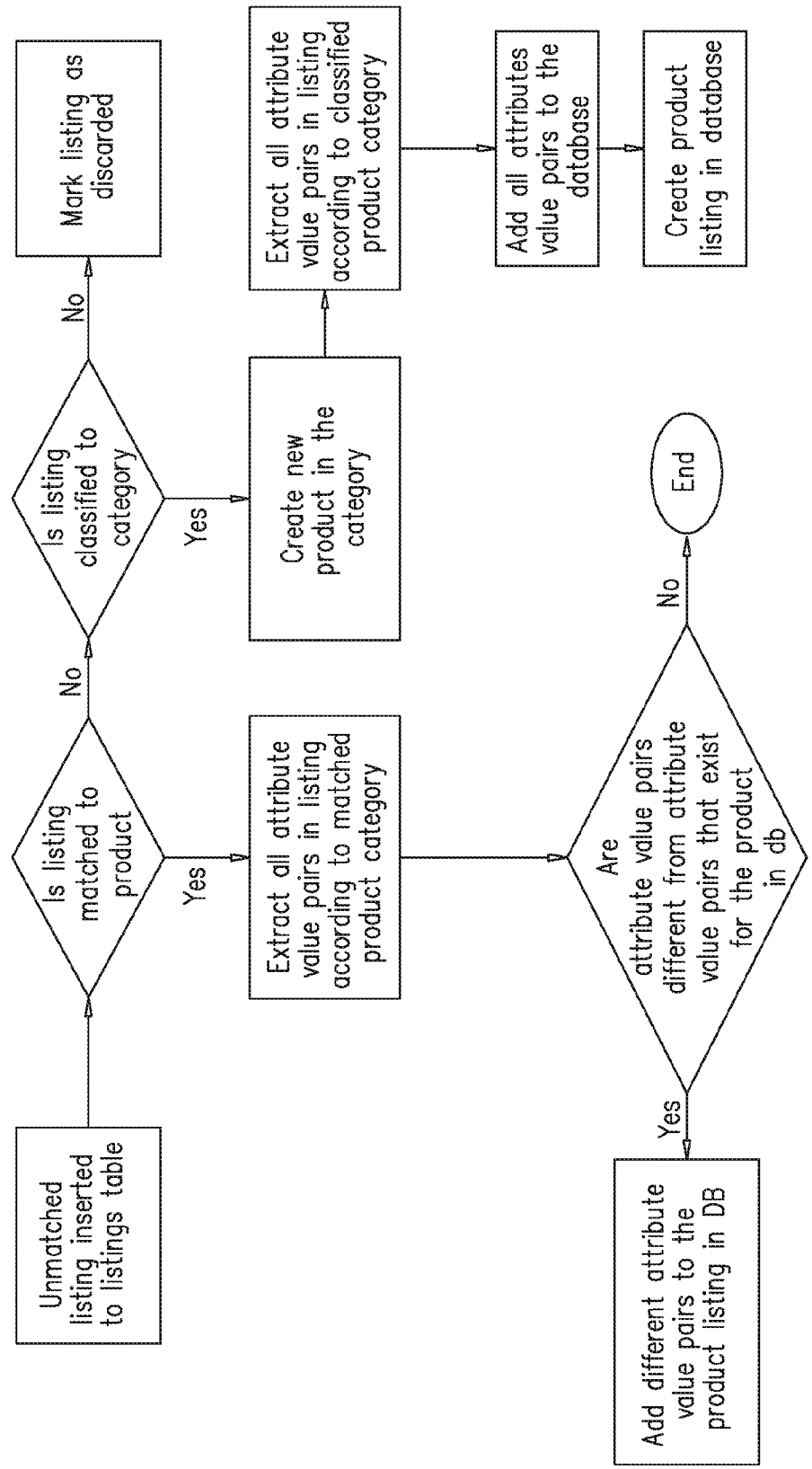
FIG. 16 is a simplified flow chart illustrating new product creation and data enrichment operation of an embodiment of the system of FIG. 1.

Reference is now made to FIG. 16, which is a simplified flow chart illustrating new product creation and data enrichment functionality 146 of system 100.

As seen in FIG. 16, if a new listing is matched to a product already in the database, all of the attributes and values in the new listing are extracted and stored in a language agnostic structured product table in database 110 in a language agnostic form.

It is then ascertained whether all of the attribute-value pairs appearing in the new listing appear in the product data as stored in the database. If there are attributes and values in the new listing which do not appear in the product data as stored in the database, these new attributes and values are added to the existing product in database 110.

If the new listing is not matched to a product already in the database, a new product row is created in the structured product table in database 110. An example of a structured product table appears in FIG. 17. A new product ID is created and all relevant attribute/value pairs are associated therewith and preferably stored in a new Structured Product Data table in database 110, an example of which appears in FIG. 18. Following the creation of the new product ID and new attribute/value pairs, the listing is added to the language agnostic structured product table in database 110 in a language agnostic form.

As seen in FIG. 16, if the new listing is not classified to a category in database 110, the new listing is discarded and system 100 preferably notifies the seller that the new listing was not able to be classified.

Figure 20:
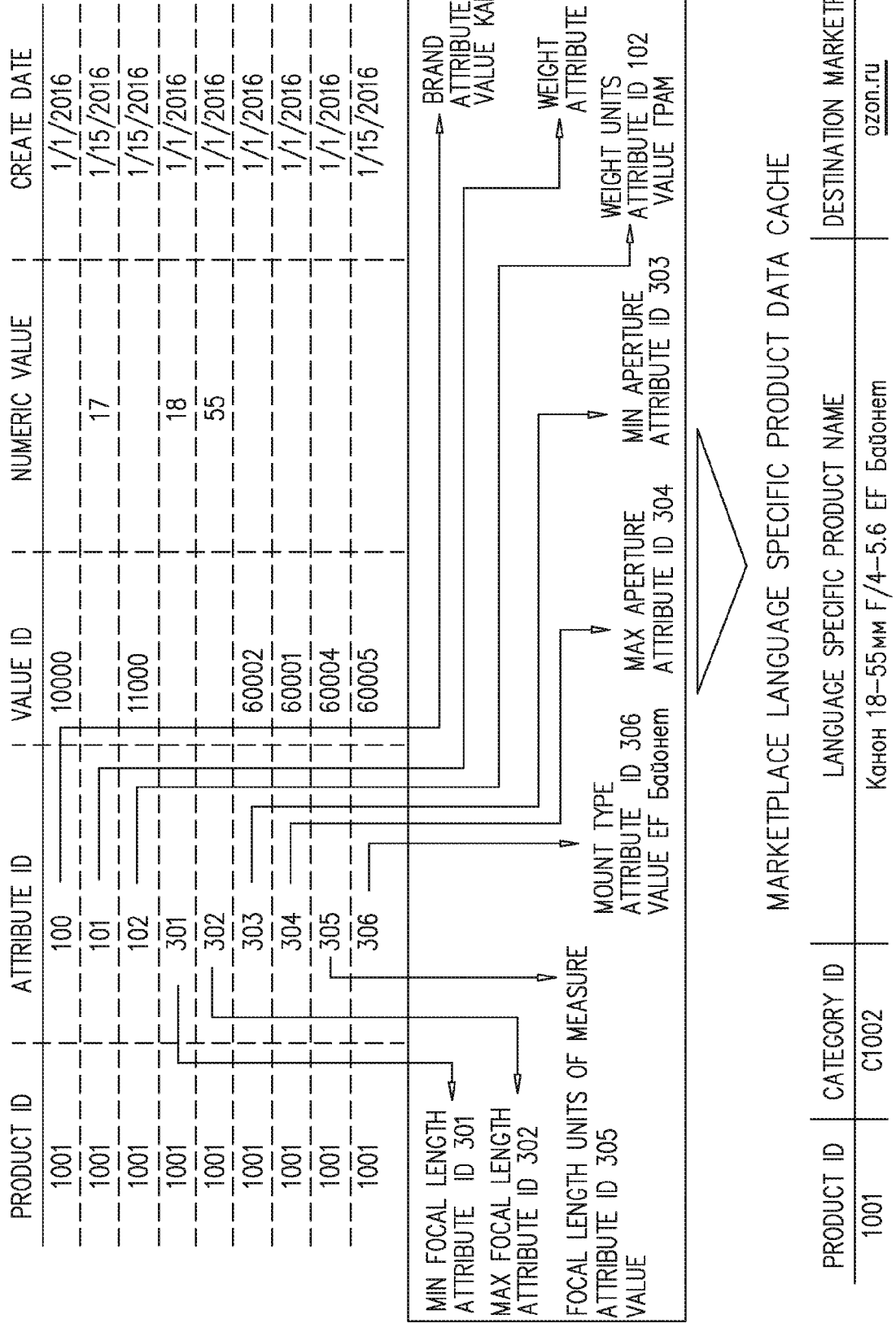
FIG. 20 is a simplified illustration of an example of operation of a language agnostic to language specific product data converting functionality, which forms part of an embodiment of the system of FIG. 1.

At this stage, the data in the database 110 is ready for export to one or more marketplaces designated by the seller (FIG. 2). For each marketplace, an initial step is to convert the product data from language agnostic form to a language specific form suitable for that marketplace. FIG. 20 shows an example of the language agnostic product data to language specific product data converting functionality 150 of system 100. Use is preferably made of a structure translation table, an example of which appears in FIG. 21. Additionally, marketplace specific conversion parameters are found in a marketplace specific data specifications table, an example of which is illustrated in FIG. 19.

Preferably, language agnostic product data to language specific product data converting functionality 150 initially converts attributes from language agnostic form into language specific form suitable for the designated marketplace. Thereafter, language agnostic product data to language specific product data converting functionality 150 translates values which are not numbers. As can be seen in FIG. 20, the process produces as outputs a plurality of attribute-value pairs, in the language specific form suitable for the designated marketplace.

Since different marketplaces employ different units of measure and currencies, various manipulations of the product data may be carried out by data export functionality 160. Typical rules for such manipulations appear in FIG. 22. Additionally, marketplace specific modifications of product data may be appropriate. FIG. 23 indicates a suitable rule for this purpose.

As seen in FIG. 23, a typical language specific product listing creation rule is presented for the OZON marketplace in the Russian language. Seven different attribute-value pairs are translated, typically by using the table of FIG. 21 and the translated values. The resulting marketplace language specific product listing is stored in a marketplace language specific product data cache in database 110 and is ready for boarding onto a designated marketplace.

Preferably, selected marketplace listing functionality 170 employs an API of a designated marketplace to board the listing onto the designated marketplace. Selected marketplace listing functionality 170 of system 100 submits a listing feed in a marketplace specific format and language via the API. The marketplace specific format includes the category mapping and attribute-value pair mapping to the specific marketplace. Examples of this mapping are seen in FIGS. 24 and 25.

There exist cases wherein this mapping is one to one and cases where the mapping is more complex, such as one to many and/or many to one. In such cases, the attribute-value pairs may be involved in the mapping.

Once the boarded marketplace category of each listed product has been selected, the attribute value pairs are mapped into the specific attribute value pairs of the boarded marketplace. This typically employs a one-to-one mapping. An example of attribute-value pair mapping appears in FIG. 25. Attribute value pairs in the database which do not exist in the boarded marketplace are typically ignored. Attribute-value pairs which exist in the boarded marketplace but do not exist in the database are also typically ignored but alternatively could be provided by conversions which are carried out in advance. An example of such a conversion appears in FIG. 26.

A further important step is unifying the marketplace-specific product information with listing information, which is not included in the product data. One example of such listing information is price information. As noted hereinabove with reference to FIG. 2, pricing policy may be marketplace specific, as selected by the seller and is not merely the result of a currency conversion, since different pricing policies may be selected by the seller for different marketplaces.

Aside from price, the listing information may include seller selected parameters relating to condition of the product, as seen in FIG. 26.

It will be appreciated by persons skilled in the art that the scope of the present invention is not limited by what has been particularly shown and described hereinabove. Rather the scope of the present invention includes the combinations and subcombinations of the features described hereinabove as well as modifications thereof which are not in the prior art.

The invention claimed is:

1. A method of transforming data comprising:
providing a structured language-agnostic product database, the structured language-agnostic product database comprising an attribute value structure table including for each of a multiplicity of products, a multiplicity of structured language-agnostic product attribute values assigned to a corresponding multiplicity of structured language-agnostic product attributes;
receiving, in a language specific form, unstructured product data describing attributes of an article, the unstructured product data comprising attribute values, which are assignable to corresponding ones of said multiplicity of structured language-agnostic product attributes;
converting said unstructured product data in said language specific form to product data in a structured language agnostic form, the structured language agnostic form comprising for each attribute of the article a language agnostic attribute ID and an associated attribute value, said converting said unstructured product data in said language specific form to product data in a structured language agnostic form comprising:
analyzing said unstructured product data in said language specific form; and
extracting, from said unstructured product data in said language specific form, unstructured product-specific attribute values, which are assignable to corresponding ones of said multiplicity of structured language agnostic product attributes;
storing said product data in said structured language agnostic form in said structured language-agnostic product database, the structured language agnostic form comprising the language agnostic attribute ID and said associated attribute value for each attribute of the article; and
exporting, on demand, said product data in at least language specific form.

2. The method of transforming data according to claim 1 and also comprising converting said unstructured product data in said language specific form to structured product data in said language specific form and wherein said converting said unstructured product data in said language specific form to said structured language agnostic form comprises converting said structured product data in said language specific form to said product data in said structured language agnostic form.

3. The method for transforming product data according to claim 1 and wherein said receiving said unstructured product data in said language specific form comprises receiving said unstructured product data in said language specific form from a vendor of a product described in said unstructured product data in said language specific form.

4. The method for transforming product data according to claim 1 and wherein said receiving said unstructured product data in said language specific form comprises automatically retrieving said unstructured product data in said language specific form from any of a plurality of electronic commerce platforms.

5. The method for transforming product data according to claim 1 and wherein said multiplicity of products are classified in a multiplicity of product categories.

6. The method for transforming product data according to claim 1 and also comprising:
converting said product data in said structured language agnostic form to a format suitable for export to any of a plurality of third-party electronic commerce platforms; and
exporting said product data in said structured language agnostic form in said format suitable for export to a particular one of said plurality of third-party electronic commerce platforms to said particular one of said plurality of third-party electronic commerce platforms.

7. The method for transforming product data according to claim 1 and wherein said converting said unstructured product data comprises:
ascertaining whether said unstructured product-specific attribute values and said corresponding unstructured product attributes in said language specific form are comprised within a dictionary, said dictionary comprising, for each product attribute and product attribute value comprised therein, a language agnostic identifier and a translation thereof to at least one language specific form;
responsive to ascertaining that said unstructured product-specific attribute values and said unstructured product attributes are comprised within said dictionary, employing said dictionary for converting said unstructured product-specific attribute values and said unstructured product attributes to said structured language agnostic form; and
responsive to ascertaining that said unstructured product-specific attribute values and said unstructured product attributes are not comprised within said dictionary, adding each of said unstructured product-specific attribute values and said unstructured product attributes in said language specific form to said dictionary and assigning a language agnostic identifier to each of said unstructured product-specific attribute values and said unstructured product attributes.

8. A system for transforming data comprising:
a language-agnostic database containing product data in a structured language agnostic form, said language-agnostic database comprising an attribute value structure table including for each of a multiplicity of products, a multiplicity of structured language-agnostic product attribute values assigned to a corresponding multiplicity of structured language-agnostic product attributes, the structured language agnostic form comprising a language-agnostic attribute ID and associated attribute value for each attribute of said product;
a data receptacle, receiving in a language specific form, unstructured product data describing attributes of an article, the data comprising attribute values assignable to corresponding ones of said multiplicity of structured language-agnostic product attributes of said article;
a language specific to language agnostic data transformer, converting said unstructured product data in said language specific form to product data in said structured language agnostic form, the structured language agnostic form comprising for each attribute of the article a language-agnostic attribute ID and an associated attribute value;
said language specific to language agnostic data transformer also comprising an unstructured product data extractor, said extractor:
analyzing said unstructured product data in said language specific form; and
extracting, from said unstructured product data in said language specific form, unstructured product-specific attribute values, which are assignable to corresponding ones of said multiplicity of structured language agnostic product attributes;
said language specific to language agnostic data transformer also converting said unstructured product-specific attribute values in said language specific form to said structured language agnostic form; and
a data exporter exporting, on demand, said product data in at least one language specific form.

9. The system for transforming data according to claim 8 and wherein said language specific to language agnostic data transformer is also:
converting said unstructured product data in said language specific form to structured product data in said language specific form; and
converting said structured product data in said language specific form to said product data in said structured language agnostic form.

10. The multi-language product catalog system according to claim 8 and wherein said data receptacle receives said unstructured product data in said language specific form from a vendor of a product described in said unstructured product data in said language specific form.

11. The multi-language product catalog system according to claim 8 and wherein said data receptacle receives said unstructured product data in said language specific form by automatically retrieving said unstructured product data in said language specific form from any of a plurality of electronic commerce platforms.

12. The multi-language product catalog system according to claim 8 and wherein said multiplicity of products are classified in a multiplicity of product categories.

13. The multi-language product catalog system according to claim 8 and also comprising:
a language agnostic to language specific data transformer, converting said product data in said structured language agnostic form to a format suitable for export to any of a plurality of third-party electronic commerce platforms; and
wherein said data exporter exports said product data in said structured language agnostic form in said format suitable for export to a particular one of said plurality of third-party electronic commerce platforms to said particular one of said plurality of third-party electronic commerce platforms.

14. The multi-language product catalog system according to claim 8 and also comprising a dictionary comprising, for each product attribute and product attribute value comprised therein, a language agnostic identifier and a translation thereof to at least one language specific form.

15. The multi-language product catalog system according to claim 14 and wherein said language specific to language agnostic data transformer:
ascertains whether said unstructured product-specific attribute values and said unstructured product attributes in said language specific form are comprised within said dictionary;
responsive to ascertaining that said unstructured product-specific attribute values and said unstructured product attributes are comprised within said dictionary, employs said dictionary for converting said unstructured product-specific attribute values and said unstructured product attributes to said structured language agnostic form; and responsive to ascertaining that said unstructured product-specific attribute values and said unstructured product attributes are not comprised within said dictionary,
adds each of said unstructured product-specific attribute values and said unstructured product attributes in said language specific form to said dictionary; and
assigns a language agnostic identifier to each of said unstructured product-specific attribute values and said unstructured product attributes.

\* \* \* \* \*